United States Patent
Goto et al.

(10) Patent No.: US 8,169,929 B2
(45) Date of Patent: May 1, 2012

(54) MOBILE COMMUNICATION METHOD, MOBILE COMMUNICATION SYSTEM, AND RADIO BASE STATION

(75) Inventors: Yoshikazu Goto, Yokohama (JP); Akihito Hanaki, Yokohama (JP); Takahiro Hayashi, Yokosuka (JP); Junichiro Kawamoto, Tokyo (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 566 days.

(21) Appl. No.: 12/372,325

(22) Filed: Feb. 17, 2009

(65) Prior Publication Data
US 2009/0227256 A1 Sep. 10, 2009

(30) Foreign Application Priority Data
Feb. 18, 2008 (JP) ................ P2008-036567

(51) Int. Cl.
*H04B 1/38* (2006.01)
*H04W 4/00* (2009.01)
(52) U.S. Cl. .............. 370/252; 370/329; 370/341
(58) Field of Classification Search .......... None
See application file for complete search history.

(56) References Cited

U.S. PATENT DOCUMENTS

| 7,613,157 | B2* | 11/2009 | Pan et al. | 370/341 |
| 7,860,052 | B2* | 12/2010 | Lohr et al. | 370/329 |
| 8,000,291 | B2* | 8/2011 | Pinheiro et al. | 370/329 |
| 2007/0049309 | A1* | 3/2007 | Pan et al. | 455/509 |
| 2007/0297360 | A1* | 12/2007 | Joachim et al. | 370/329 |
| 2008/0069035 | A1* | 3/2008 | Pinheiro et al. | 370/328 |
| 2008/0089296 | A1* | 4/2008 | Kazmi et al. | 370/336 |
| 2008/0254804 | A1* | 10/2008 | Lohr et al. | 455/442 |
| 2010/0240383 | A1* | 9/2010 | Ankel et al. | 455/452.1 |

OTHER PUBLICATIONS

3GPP TS 25.321 V7.7.0 (Dec. 2007). 3rd Generation Partnership Project; Technical Specification Group Radio Access Network; Medium Access Control (MAC) protocol specification (Release 7), 146 pages.

* cited by examiner

*Primary Examiner* — Chi Pham
*Assistant Examiner* — Soon-Dong Hyun
(74) *Attorney, Agent, or Firm* — Marvin A. Motsenbocker; Mots Law, PLLC

(57) ABSTRACT

A mobile communication method includes: causing a cell under control of a radio base station to determine an initial granted value when an uplink user data transmission channel is set up between a mobile station and the cell under the control of the radio base station; causing a radio network controller to notify the mobile station of the initial granted value determined by the cell under the control of the radio base station; and causing the mobile station to transmit uplink user data via the uplink user data transmission channel at a transmission rate corresponding to the initial granted value after the uplink user data transmission channel is set up, and the cell under the control of the radio base station sets the initial granted value to be equal to the granted value used in transmitting only a single data unit on the uplink user data transmission channel.

21 Claims, 9 Drawing Sheets

FIG. 9

| E-TFCI | TBS(BITS) |
|---|---|
| 0 | 18 |
| 1 | 186 |
| 2 | 204 |
| 3 | 354 |
| 4 | 372 |
| 5 | 522 |
| 6 | 540 |
| ⋮ | ⋮ |

FIG. 10

| Quantized amplitude ratios $\beta_{ed,k}/\beta_c$ |
|---|
| 168/15 |
| 150/15 |
| 134/15 |
| 119/15 |
| 106/15 |
| 95/15 |
| 84/15 |
| 75/15 |
| 67/15 |
| 60/15 |
| 53/15 |
| 47/15 |
| 42/15 |
| 38/15 |
| 34/15 |
| 30/15 |
| 27/15 |
| 24/15 |
| 21/15 |
| 19/15 |
| 17/15 |
| 15/15 |
| 13/15 |
| 12/15 |
| 11/15 |
| 9/15 |
| 8/15 |
| 7/15 |
| 6/15 |
| 5/15 |

FIG. 11

| Absolute Grant Value | Index |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT* | 1 |
| INACTIVE* | 0 |

FIG. 12

| Index | Scheduled Grant |
|---|---|
| 37 | $(168/15)^2 * 6$ |
| 36 | $(150/15)^2 * 6$ |
| 35 | $(168/15)^2 * 4$ |
| 34 | $(150/15)^2 * 4$ |
| 33 | $(134/15)^2 * 4$ |
| 32 | $(119/15)^2 * 4$ |
| 31 | $(150/15)^2 * 2$ |
| 30 | $(95/15)^2 * 4$ |
| 29 | $(168/15)^2$ |
| 28 | $(150/15)^2$ |
| 27 | $(134/15)^2$ |
| 26 | $(119/15)^2$ |
| 25 | $(106/15)^2$ |
| 24 | $(95/15)^2$ |
| 23 | $(84/15)^2$ |
| 22 | $(75/15)^2$ |
| 21 | $(67/15)^2$ |
| 20 | $(60/15)^2$ |
| 19 | $(53/15)^2$ |
| 18 | $(47/15)^2$ |
| 17 | $(42/15)^2$ |
| 16 | $(38/15)^2$ |
| 15 | $(34/15)^2$ |
| 14 | $(30/15)^2$ |
| 13 | $(27/15)^2$ |
| 12 | $(24/15)^2$ |
| 11 | $(21/15)^2$ |
| 10 | $(19/15)^2$ |
| 9 | $(17/15)^2$ |
| 8 | $(15/15)^2$ |
| 7 | $(13/15)^2$ |
| 6 | $(12/15)^2$ |
| 5 | $(11/15)^2$ |
| 4 | $(9/15)^2$ |
| 3 | $(8/15)^2$ |
| 2 | $(7/15)^2$ |
| 1 | $(6/15)^2$ |
| 0 | $(5/15)^2$ |

MOBILE COMMUNICATION METHOD, MOBILE COMMUNICATION SYSTEM, AND RADIO BASE STATION

CROSS REFERENCE TO RELATED APPLICATION

This application is based upon and claims the benefit of priority from prior Japanese Patent Application No. 2008-036567, filed on Feb. 18, 2008; the entire contents of which are incorporated herein by reference.

BACKGROUND OF THE INVENTION

1. Field of the Invention

The present invention relates to a mobile communication method, a mobile communication system, and a radio base station by which uplink user data are transmitted at a transmission rate corresponding to a granted value notified to a mobile station by a cell under the control of a radio base station.

2. Description of the Related Art

In a mobile communication system employing an Enhanced Uplink (EUL) method defined by 3GPP, that is, High Speed Uplink Packet Access (HSUPA) method, a cell (a serving cell) under the control of a radio base station NodeB determines an initial value (initial granted value, Initial SG) of a SG (granted value, Scheduling Grant) to be notified to a mobile station UE in the following cases:

An uplink user data transmission channel (Enhanced-Dedicated Channel: E-DCH) is set up between the mobile station UE and the cell under the control of the radio base station NodeB (start of E-DCH transmission);

A serving cell for the mobile station UE is changed (E-DCH serving cell change); and A change is made to a sub-frame (Transmission Time Interval: TTI) length in the uplink user data transmission channel (E-DCH) set up between the mobile station UE and the cell under the control of the radio base station NodeB (TTI change).

In addition, the mobile station UE is configured to transmit uplink user data via a set up uplink user data transmission channel at a transmission rate corresponding to an initial SG notified by a radio network controller RNC by use of an RRC message until receiving an SG notified by the serving cell under control of the radio base station NodeB (see 3GPP TS 25.321, 11.8.1.3.2 to 11.8.1.3.5).

However, in 3GPP, there is no definition on how the serving cell under the control of the radio base station NodeB determines the initial SG.

Accordingly, when the serving cell under the control of the radio base station NodeB sets an initial SG too large, received power of the uplink user data in the radio base station NodeB drastically changes. This causes a problem that the quality of receiving uplink user data in communication is deteriorated.

SUMMARY OF THE INVENTION

A first aspect of the present invention is summarized as a mobile communication method by which a mobile station transmits uplink user data at a transmission rate corresponding to a granted value notified to the mobile station by a cell under control of a radio base station. The mobile communication method includes: causing the cell under the control of the radio base station to determine an initial granted value when an uplink user data transmission channel is set up between the mobile station and the cell under the control of the radio base station; causing the cell under the control of the radio base station to notify a radio network controller of the initial granted value determined; causing the radio network controller to notify the mobile station of the initial granted value notified by the cell under the control of the radio base station; and causing the mobile station to transmit the uplink user data via the uplink user data transmission channel at the transmission rate corresponding to the initial granted value notified by the radio network controller, after the uplink user data transmission channel is set up, until the mobile station receives the granted value notified by the cell under the control of the radio base station. The cell under the control of the radio base station sets the initial granted value to be equal to the granted value used in transmitting only a single data unit on the uplink user data transmission channel.

A second aspect of the present invention is summarized as a mobile communication method by which a mobile station transmits uplink user data at a transmission rate corresponding to a granted value notified to the mobile station by a cell under control of a radio base station. The mobile communication method includes: causing a target cell to determine an initial granted value when a serving cell for the mobile station is changed from a source cell under the control of a first radio base station to the target cell under the control of a second radio base station; causing the target cell to notify a radio network controller of the initial granted value determined; causing the radio network controller to notify the mobile station of the initial granted value notified by the target cell; and causing the mobile station to transmit the uplink user data via an uplink user data transmission channel set up between the mobile station and the target cell at the transmission rate corresponding to the initial granted value notified by the radio network controller, after the change of the serving cell, until the mobile station receives the granted value notified by the target cell. The target cell sets the initial granted value to be equal to the granted value used in transmitting only a single data unit on the uplink user data transmission channel.

A third aspect of the present invention is summarized as a mobile communication method by which a mobile station transmits uplink user data at a transmission rate corresponding to a granted value notified to the mobile station by a cell under control of a radio base station. The mobile communication method includes: causing a target cell to determine an initial granted value when a serving cell for the mobile station is changed from a source cell included in a cell set in communication under the control of the radio base station to the target cell not in communication under the control of the radio base station; causing the target cell to notify a radio network controller of the initial granted value determined; causing the radio network controller to notify the mobile station of the initial granted value notified by the target cell; and causing the mobile station to transmit the uplink user data via an uplink user data transmission channel set up between the mobile station and the target cell at the transmission rate corresponding to the initial granted value notified by the radio network controller, after the change of the serving cell, until the mobile station receives the granted value notified by the target cell. The target cell sets the initial granted value to be equal to the granted value used in transmitting only a single data unit on the uplink user data transmission channel.

A fourth aspect of the present invention is summarized as a mobile communication method by which a mobile station transmits uplink user data at a transmission rate corresponding to a granted value notified to the mobile station by a cell under control of a radio base station. The mobile communication method includes: causing the cell under the control of the radio base station to determine an initial granted value when a change is made to a sub-frame length in an uplink user data transmission channel set up between the mobile station and the cell under the control of the radio base station; causing the cell under the control of the radio base station to notify a radio network controller of the initial granted value determined; causing the radio network controller to notify the mobile station of the initial granted value notified by the cell under the radio base station; and causing the mobile station to transmit the uplink user data via the uplink user data transmission channel at the transmission rate corresponding to the initial granted value notified by the radio network controller, after the change of the sub-frame length in the uplink user data transmission channel, until the mobile station receives the granted value notified by the cell under the control of the radio base station. The cell under the control of the radio base station sets the initial granted value to be equal to the granted value used in transmitting only a single data unit on the uplink user data transmission channel.

In the first to fourth aspects of the present invention, when the serving cell for the mobile station is changed from a first cell to a second cell included in a cell set in communication under the control of the radio base station, the radio network controller does not notify the mobile station of the initial granted value.

In the first to fourth aspects of the present invention, when the serving cell for the mobile station is changed from a first cell to a second cell included in a cell set in communication under the control of the radio base station, the radio network controller notifies the mobile station of the initial granted value notified by the radio base station.

In the first to fourth aspects of the present invention, when the serving cell for the mobile station is changed from a first cell to a second cell included in a cell set in communication under the control of the radio base station, the second cell notifies the mobile station of a latest granted value notified to the mobile station by the first cell.

In the first to fourth aspects of the present invention, when the serving cell for the mobile station is changed from a first cell to a second cell included in a cell set in communication under the control of the radio base station, the second cell does not notify the mobile station of a latest granted value notified to the mobile station by the first cell.

A fifth aspect of the present invention is summarized as a mobile communication system in which a mobile station is configured to transmit uplink user data at a transmission rate corresponding to a granted value notified by a cell under control of a radio base station. The cell under the control of the radio base station is configured to determine an initial granted value when an uplink user data transmission channel is set up between the mobile station and the cell under the control of the radio base station. The cell under the control of the radio base station is configured to notify a radio network controller of the initial granted value determined. The radio network controller is configured to notify the mobile station of the initial granted value notified by the cell under the control of the radio base station. The mobile station is configured to transmit the uplink user data via the uplink user data transmission channel at the transmission rate corresponding to the initial granted value notified by the radio network controller, after the uplink user data transmission channel is set up, until the mobile station receives the granted value notified by the cell under the control of the radio base station. The cell under the control of the radio base station is configured to set the initial granted value to be equal to the granted value used in transmitting only a single data unit on the uplink user data transmission channel.

A sixth aspect of the present invention is summarized as a mobile communication system in which a mobile station is configured to transmit uplink user data at a transmission rate corresponding to a granted value notified by a cell under control of a radio base station. A target cell is configured to determine an initial granted value when a serving cell for the mobile station is changed from a source cell under the control of a first radio base station to the target cell under the control of a second radio base station. The target cell is configured to notify a radio network controller of the initial granted value determined. The radio network controller is configured to notify the mobile station of the initial granted value determined by the target cell. The mobile station is configured to transmit the uplink user data via an uplink user data transmission channel set up between the mobile station and the target cell at the transmission rate corresponding to the initial granted value notified by the radio network controller, after the change of the serving cell, until the mobile station receives the granted value notified by the target cell. The target cell is configured to set the initial granted value to be equal to the granted value used in transmitting only a single data unit on the uplink user data transmission channel.

A seventh aspect of the present invention is summarized as a mobile communication system in which a mobile station is configured to transmit uplink user data at a transmission rate corresponding to a granted value notified by a cell under control of a radio base station. A target cell is configured to determine an initial granted value when a serving cell for the mobile station is changed from a source cell included in a cell set in communication under the control of the radio base station to the target cell not in communication under the control of the radio base station. The target cell is configured to notify a radio network controller of the initial granted value determined. The radio network controller is configured to notify the mobile station of the initial granted value determined by the target cell. The mobile station is configured to transmit the uplink user data via an uplink user data transmission channel set up between the mobile station and the target cell at the transmission rate corresponding to the initial granted value notified by the radio network controller, after the change of the serving cell, until the mobile station receives the granted value notified by the target cell. The target cell is configured to set the initial granted value to be equal to the granted value used in transmitting only a single data unit on the uplink user data transmission channel.

A eighth aspect of the present invention is summarized as a mobile communication system in which a mobile station is configured to transmit uplink user data at a transmission rate corresponding to a granted value notified by a cell under control of a radio base station. The cell under the control of the radio base station is configured to determine an initial granted value when a change is made to a sub-frame length in an uplink user data transmission channel set up between the mobile station and the cell under the control of the radio base station. The cell under the control of the radio base station is configured to notify a radio network controller of the initial granted value determined. The radio network controller is configured to notify the mobile station of the initial granted value determined by the cell under the control of the radio base station. The mobile station is configured to transmit the uplink user data via the uplink user data transmission channel at the transmission rate corresponding to the initial granted value notified by the radio network controller, after the change of the sub-frame length in the uplink user data transmission channel, until the mobile station receives the granted value notified by the cell under the control of the radio base station. The cell under the control of the radio base station is configured to set the initial granted value to be equal to the granted value used in transmitting only a single data unit on the uplink user data transmission channel.

In the fifth to eighth aspects of the present invention, when the serving cell for the mobile station is changed from a first cell to a second cell included in a cell set in communication under the control of the radio base station, the radio network controller is configured not to notify the mobile station of the initial granted value.

In the fifth to eighth aspects of the present invention, when the serving cell for the mobile station is changed from a first cell to a second cell included in the cell set in communication under the control of the radio base station, the radio network controller is configured to notify the mobile station of the initial granted value notified by the radio base station.

In the fifth to eighth aspects of the present invention, when the serving cell for the mobile station is changed from a first cell to a second cell included in a cell set in communication under the control of the radio base station, the second cell is configured to notify the mobile station of a latest granted value notified to the mobile station by the first cell.

In the fifth to eighth aspects of the present invention, when the serving cell for the mobile station is changed from a first cell to a second cell included in a cell set in communication under the control of the radio base station, the second cell is configured not to notify the mobile station of the latest granted value notified to the mobile station by the first cell.

A ninth aspect of the present invention is summarized as a radio base station used for a mobile communication system in which a mobile station is configured to transmit uplink user data at a transmission rate corresponding to a granted value notified by a cell under control of a radio base station. The radio base station includes: a granted value determination unit configured to determine an initial granted value when an uplink user data transmission channel is newly set up between the mobile station and the cell under the control of the radio base station; and an initial granted value notification unit configured to notify a radio network controller of the initial granted value determined. The mobile station is configured to transmit the uplink user data via the uplink user data transmission channel at the transmission rate corresponding to the initial granted value notified by the radio network controller, after the uplink user data transmission channel is set up, until the mobile station receives the granted value notified by the cell under the control of the radio base station. The granted value determination unit is configured to set the initial granted value to be equal to the granted value used in transmitting only a single data unit on the uplink user data transmission channel.

A tenth aspect of the present invention is summarized as a radio base station used for a mobile communication system in which a mobile station is configured to transmit uplink user data at a transmission rate corresponding to a granted value notified by a cell under control of a radio base station. The radio base station includes: a granted value determination unit configured to determine an initial granted value when a serving cell for the mobile station is changed, from a source cell under the control of a first radio base station different from the radio base station, to a target cell under the control of the radio base station; and an initial granted value notification unit configured to notify a radio network controller of the initial granted value determined The mobile station is configured to transmit the uplink user data via an uplink user data transmission channel set up between the mobile station and the target cell at the transmission rate corresponding to the initial granted value notified by the radio network controller, after the change of the serving cell, until the mobile station receives the granted value notified by the target cell The granted value determination unit is configured to set the initial granted value to be equal to the granted value used in transmitting only a single data unit on the uplink user data transmission channel.

A eleventh aspect of the present invention is summarized as a radio base station used for a mobile communication system in which a mobile station is configured to transmit uplink user data at a transmission rate corresponding to a granted value notified by a cell under control of a radio base station. The radio base station includes: a granted value determination unit configured to determine an initial granted value when a serving cell for the mobile station is changed from a source cell included in a cell set in communication under the control of the radio base station to a target cell not in communication under the control of the radio base station; and an initial granted value notification unit configured to notify a radio network controller of the initial granted value determined. The mobile station is configured to transmit the uplink user data via an uplink user data transmission channel set up between the mobile station and the target cell at the transmission rate corresponding to the initial granted value notified by the radio network controller, after the change of the serving cell, until the mobile station receives the granted value notified by the target cell. The granted value determination unit is configured to set the initial granted value to be equal to the granted value used in transmitting only a single data unit on the uplink user data transmission channel.

A twelfth aspect of the present invention is summarized as a radio base station used for a mobile communication system in which a mobile station is configured to transmit uplink user data at a transmission rate corresponding to a granted value notified by a cell under control of a radio base station. The radio base station includes: a granted value determination unit is configured to determine an initial granted value when a change is made to a sub-frame length in an uplink user data transmission channel set up between the mobile station and the cell under the control of the radio base station; and an initial granted value notification unit configured to notify a radio network controller of the initial granted value determined The mobile station is configured to transmit the uplink user data via the uplink user data transmission channel at the transmission rate corresponding to the initial granted value notified by the cell under the control of the radio network controller, after the change of the sub-frame length in the uplink user data transmission channel, until the mobile station receives the granted value notified by the cell under the control of the radio base station. The granted value determination unit is configured to set the initial granted value to be equal to the granted value used in transmitting only a single data unit on the uplink user data transmission channel.

In the ninth to twelfth aspects of the present invention, when the serving cell for the mobile station is changed from a first cell to a second cell included in a cell set in communication under the control of the radio base station, the second cell notifies the mobile station of a latest granted value notified to the mobile station by the first cell.

BRIEF DESCRIPTION OF THE DRAWINGS

FIG. 9 is a view showing an example of a correspondence table between "E-TFCI" and "TBS" managed by the cell under the control of the radio base station according to the first embodiment of the present invention.

FIG. 10 is a view showing an example of a table of "$\beta_{ed,k}/\beta_c$" managed by the cell under the control of the radio base station according to the first embodiment of the present invention.

FIG. 11 is a view showing an example of a table of correspondence between "Absolute Grant Value" and "Index" managed by the cell under the control of the radio base station according to the first embodiment of the present invention.

FIG. 12 is a view showing an example of a table of correspondence between "Index" and "Scheduling Grant" managed by the cell under the control of the radio base station according to the first embodiment of the present invention.

DETAILED DESCRIPTION OF THE EMBODIMENTS (Configuration of the Mobile Communication System According to a First Embodiment of the Present Invention)

Figure 1:
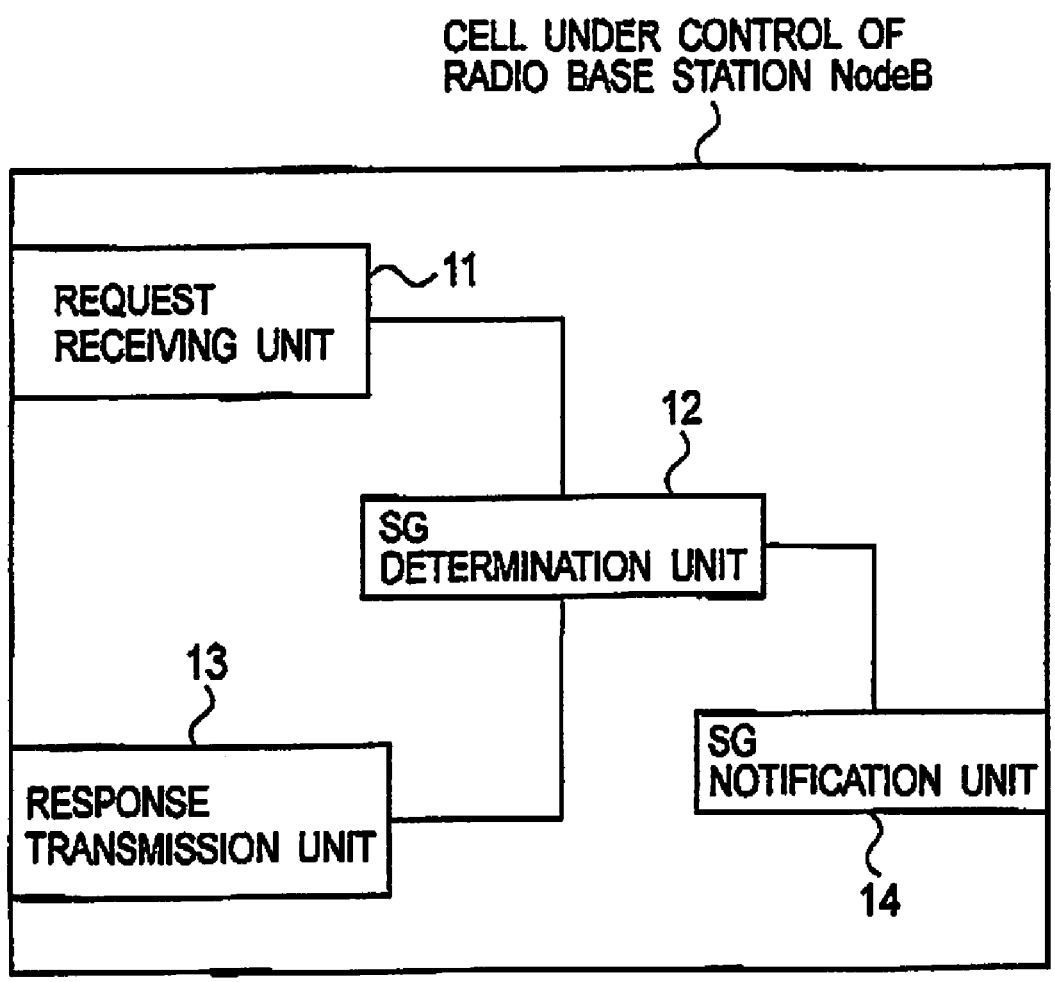
FIG. 1 is a functional block diagram of a cell under the control of a radio base station according to a first embodiment of the present invention.

With reference to FIG. 1, a configuration of a mobile communication system according to the first embodiment of the present invention is described.

In the mobile communication system according to the first embodiment, an EUL method is adopted, and the mobile communication system is configured to use HARQ (Hybrid ARQ) re-transmission control for uplink data communication between a radio base station Nodes and a mobile station UE.

In the first embodiment, a description is given of a configuration in which different devices are used for the radio base station NodeB and a radio network controller RNC, respectively. However, the present invention is also applicable to a configuration in which a single device is used for the radio base station NodeB and the radio network controller RNC.

As shown in FIG. 1, a cell under the control of the radio base station NodeB according to the first embodiment includes a request receiving unit 11, a SG determination unit 12, a response transmission unit 13, and a SG notification unit 14.

The request receiving unit 11 is configured to receive a "Radio Link Setup Request", "Radio Link Reconfiguration Prepare," and others transmitted from the radio network controller RNC.

Figure 2:
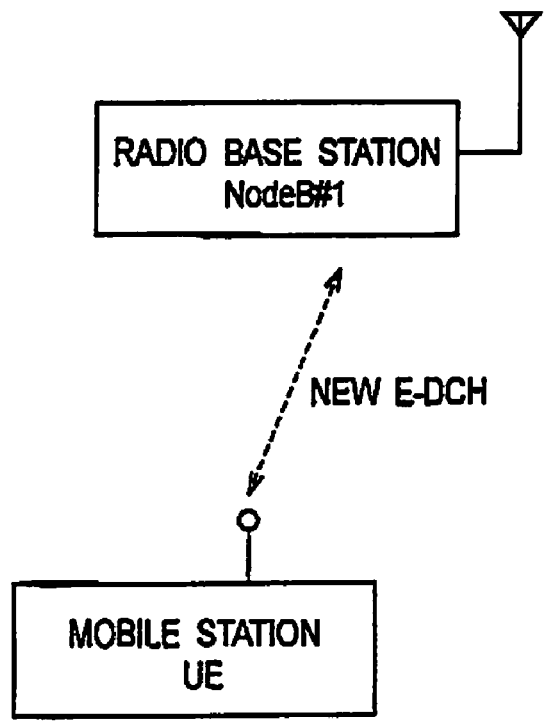
FIG. 2 is a view showing an example in the case where an initial SG is determined by the cell under the control of the radio base station according to the first embodiment of the present invention.

As shown in FIG. 2, when an uplink user data transmission channel (E-DCH) is set up between the mobile station UE and a cell under the control of a radio base station NodeB#1, the SG determination unit 12 in the cell under the control of the radio base station NodeB#1 is configured to determine an initial SG (initial granted value) needed to be notified to the mobile station UE.

Figure 3:
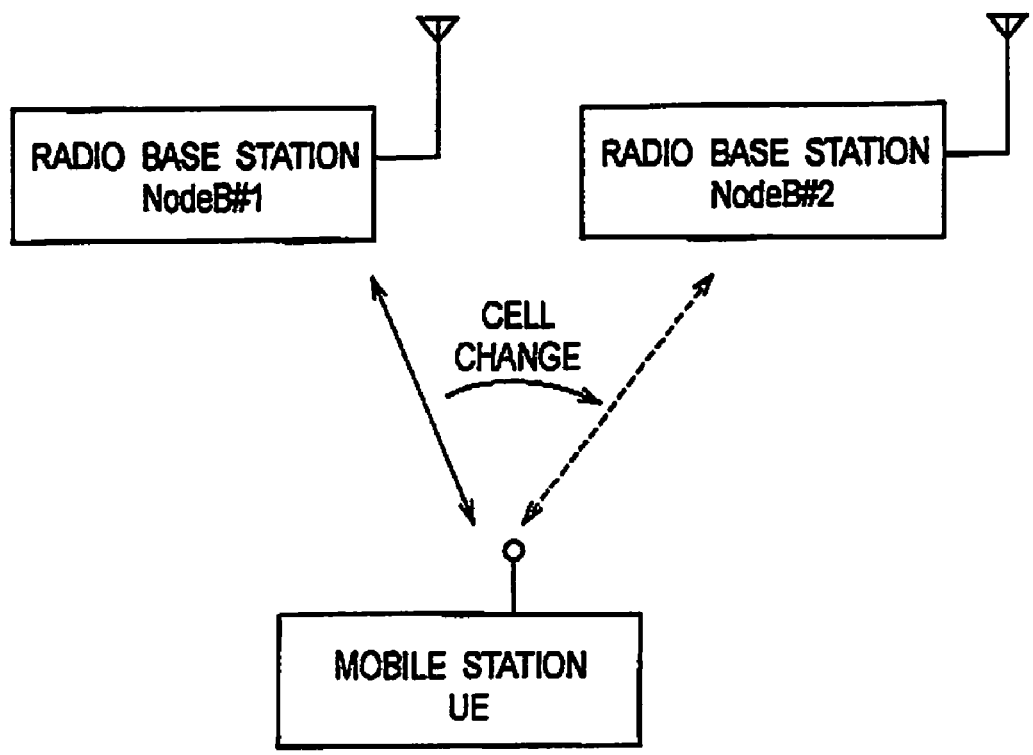
FIG. 3 is a view showing another example in the case where an initial SG is determined by the cell under the control of the radio base station according to the first embodiment of the present invention.

Further, as shown in FIG. 3, when a serving cell for the mobile station UE is changed from a cell (source cell) under the control of a first radio base station NodeB#1 to a cell (target cell) under the control of a second radio base station NodeB#2, the SG determination unit 12 in the cell (target cell) under the control of the second radio base station NodeB#2 is configured to determine an initial SG (initial granted value) to be notified to the mobile station UE.

Figure 4:
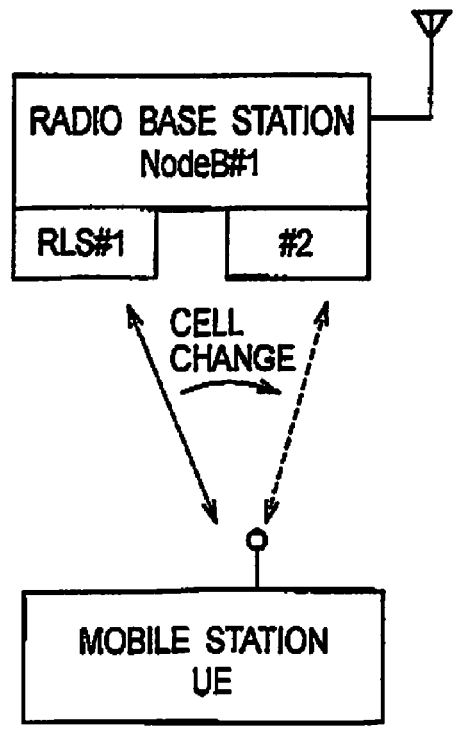
FIG. 4 is a view showing still another example in the case where an initial SG is determined by the cell under the control of the radio base station according to the first embodiment of the present invention.

Further, as shown in FIG. 4, when a serving cell for the mobile station UE is changed from a cell (source cell) included in a cell set Radio Link Set (RLS) #1 in communication under the control of the radio base station NodeB#1 to a cell (target cell) #2 not in communication under the control of the radio base station NodeB#1, the SG determination unit 12 in the cell (target cell) under the control of the radio base station NodeB#1 is configured to determine an initial SG (initial granted value) to be notified to the mobile station UE.

Still further, when a change is made to a sub-frame (TTI) length in an uplink user data transmission channel (E-DCH) set up between the mobile station UE and a cell under the control of a radio base station NodeB, the SG determination unit 12 in the cell under the control of the base station NodeB is configured to determine an initial SG (initial granted value) to be notified to the mobile station UE.

Here, the above-mentioned SG determination unit 12 is configured to set an initial SG (Initial SG, initial granted value) to be equal to a granted value (SG) used in transmitting only a single data unit (RLC-PDU) on an uplink user data transmission channel (E-DCH).

However, the SG determination unit 12 may also be configured to set the initial SG to be equal to a granted value (SG) used in transmitting only the single RLC-PDU and Scheduling Information (SI) on the uplink user data transmission channel (E-DCH).

Note that a specific method of determining an initial SG will be described later.

Figure 5:
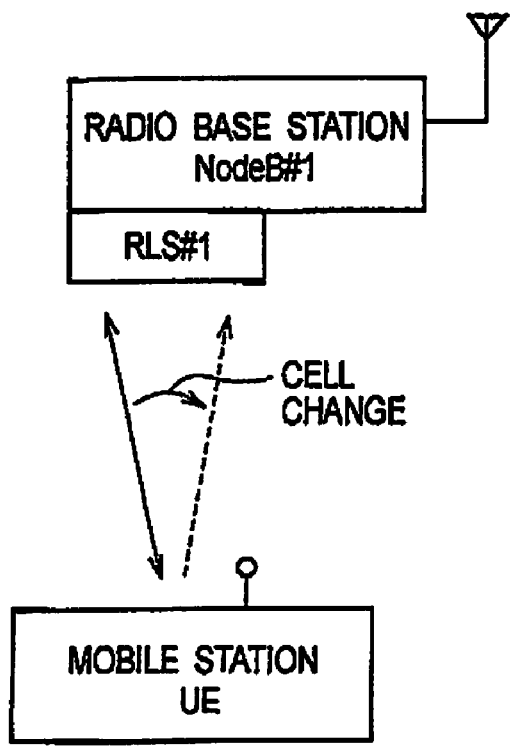
FIG. 5 is a view showing a yet another example in the case where an initial SG is determined by the cell under the control of the radio base station according to the first embodiment of the present invention.

Further, as shown in FIG. 5, when a serving cell for the mobile station UE is changed from a first cell to a second cell included in a cell set RLS in communication under the control of the radio base station NodeB#1, the SG determination unit 12 in the second cell under the control of the radio base station NodeB#1 may be configured to determine an initial SG (initial granted value) to be notified to the mobile station UE as a latest SG (granted value) which has been notified to the mobile station UE by the SG notification unit 14 of the first cell.

Further, as shown in FIG. 5, when the serving cell for the mobile station UE is changed from the first cell to the second cell included in the cell set RLS in communication under the control of the radio base station NodeB#1, the SG determination unit 12 in the second cell under the control of the radio base station NodeB#1 may be configured not to determine an initial SG (initial granted value) to be notified to the mobile station UE.

Still further, in each sub-frame (TTI), the SG determination unit 12 is configured to determine a mobile station UE from which uplink user data is transmittable, to assign to the mobile station UE a transmission rate (a radio resource for uplink user data transmission) at which the uplink user data is transmittable, and to output an SG (granted value) corresponding to the assigned transmission rate (radio resource).

The response transmission unit 13 is configured to transmit "Radio Link Setup Response", "Radio Link Reconfiguration Ready", and others to the radio network controller RNC.

Note that the response transmission unit 13 is configured to notify the radio network controller RNC of the initial SG determined by the SG determination unit 12, with "Radio Link Setup Response", "Radio Link Reconfiguration Ready" and others.

Further, as shown in FIG. 5, when the serving cell for the mobile station UE is changed from the first cell to the second cell included in the cell set RLS in communication under the control of the radio base station NodeB#1, the response transmission unit 13 in the second cell under the control of the radio base station NodeB#1 may be configured to notify or not notify the radio network controller RNC of the initial SG (initial granted value).

The SG notification unit 14 is configured to notify a mobile station UE (a mobile station UE capable of transmitting uplink user data) being a scheduling target of the SG outputted by the SG determination unit 12 through E-DCH Absolute Grant Channel (E-AGCH) or E-DCH Relative Grant Channel (E-RGCH).

Note that, as shown in FIG. 5, when the serving cell for the mobile station UE is changed from the first cell to the second cell included in the cell set RLS in communication under the control of the radio base station NodeB#1, the SG notification unit 14 in the second cell under the control of the radio base station NodeB#1 may be configured not to notify the mobile station UE of the initial SG (initial granted value), or to again notify the mobile station UE of the latest SG (granted value) that has been notified to the mobile station UE by the SG notification unit 14 in the first cell.

In such a case, in the radio base station NodeB, a radio resource equivalent to the radio resource secured before the change of the serving cell mentioned above is secured as the radio resource for uplink user data transmission in the mobile station UE.

(Operation of the Mobile Communication System According to the First Embodiment of the Present Invention)

Operation of the mobile communication system according to the first embodiment of the present invention is described with reference to FIGS. 6 to 12.

Figure 6:
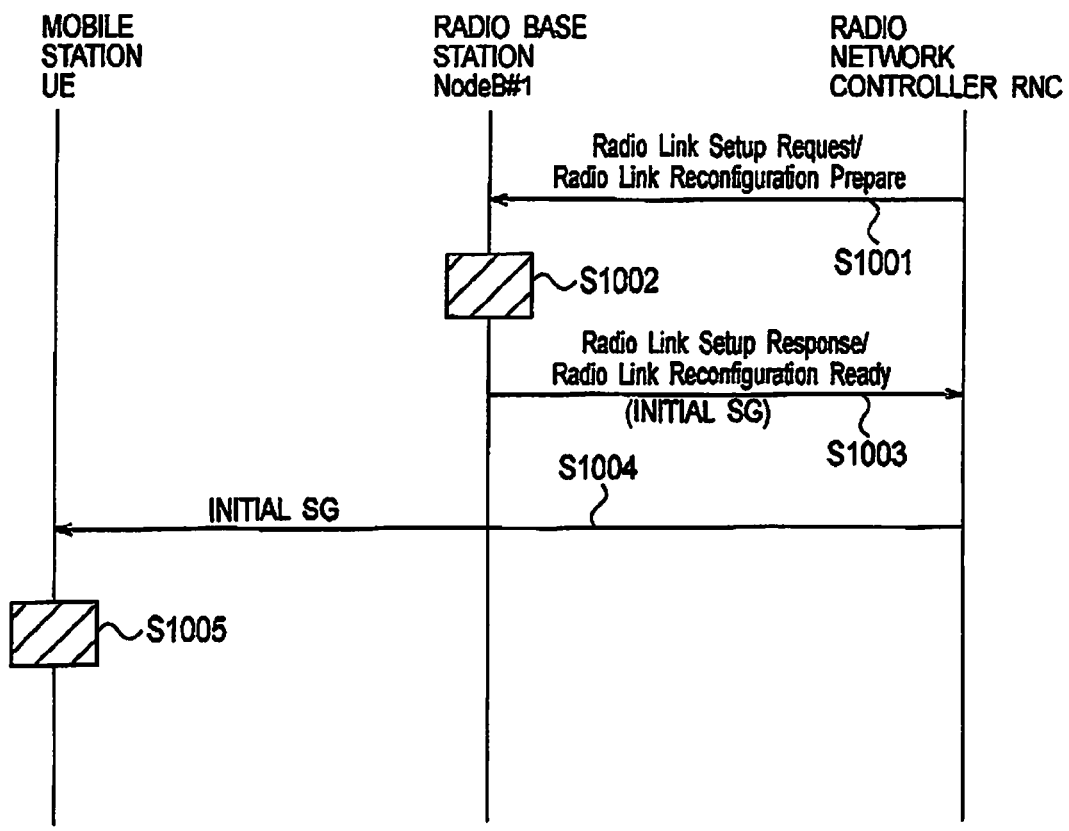
FIG. 6 is a sequential diagram showing operation of a mobile communication system according to the first embodiment of the present invention.

As shown in FIG. 6, in Step S1001 the radio network controller RNC transmits "Radio Link Setup Request" or "Radio Link Reconfiguration Prepare" being a NBAP message, to a cell under the control of the radio base station NodeB#1.

However, when the serving cell for the mobile station UE is changed from a cell under the control of the radio base station NodeB#1 to a cell under the control of the radio base station NodeB#2, the radio network controller RNC transmits "Radio Link Setup Request" or "Radio Link Reconfiguration Prepare," being a NBAP message, to the cell under the control of the radio base station NodeB#2.

In Step S1002, the cell under the control of the radio base station NodeB#1 (in the example of FIG. 3, the radio base station NodeB#2) performs a process corresponding to "Radio Link Setup Request" or "Radio Link Reconfiguration Prepare," and the cell under the control of the radio base station NodeB#1 determines an initial value of SG (initial SG) to be notified to a target mobile station UE in the following cases.

An uplink user data transmission channel (E-DCH) is set up between a mobile station UE and a cell under the control of a radio base station NodeB#1 (refer to FIG. 2).

A serving cell for the mobile station UE is changed from a cell under the control of a first radio base station NodeB#1 to a cell under the control of a second radio base station NodeB#2 (refer to FIG. 3).

The serving cell for the mobile station UE is changed from a cell included in a cell set RLS#1 in communication under the control of a radio base station NodeB#1 to a cell#2 not in communication under the control of the radio base station NodeB#1 (refer to FIG. 4).

A change is made to a sub-frame (TTI) length in the uplink user data transmission channel (E-DCH) set up between the mobile station UE and a cell under the control of the radio base station NodeB.

A method of determining a granted value of the SG is described with reference to FIGS. 7 to 12. Note that the cell under the control of the radio base station NodeB#2 is taken as an example in FIG. 3, but operation of the cell under the radio base station NodeB#1 is the same as the operation of the cell under the control of the radio base station NodeB#2, therefore the operation of the cell under the control of the radio base station NodeB#1 is described in what follows.

Figure 7:
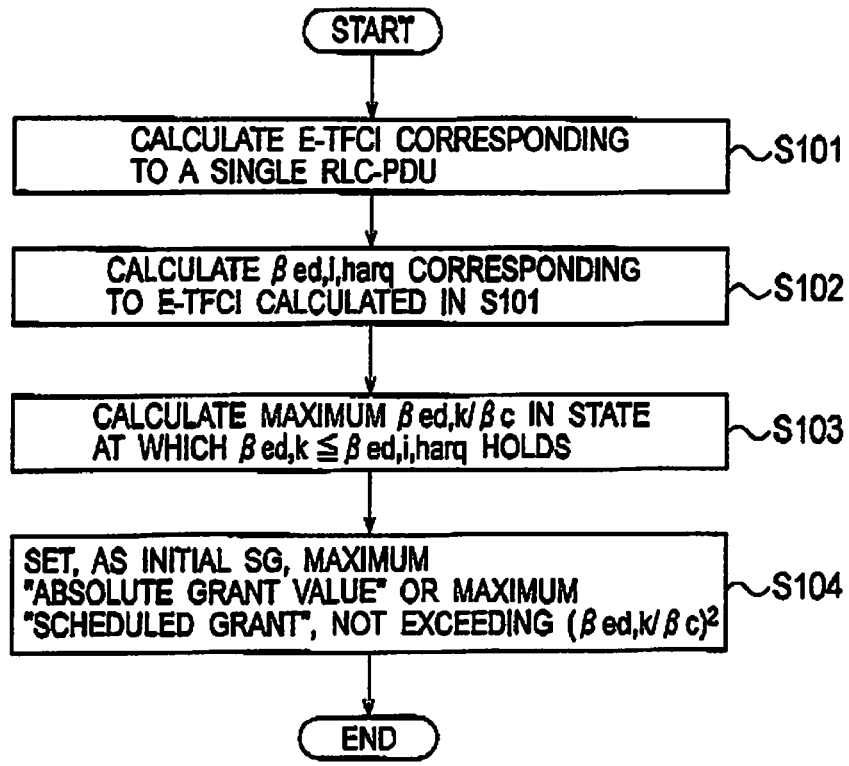
FIG. 7 is a flowchart showing operation of a cell under the control of the radio base station according to the first embodiment of the present invention.
Figure 8A:
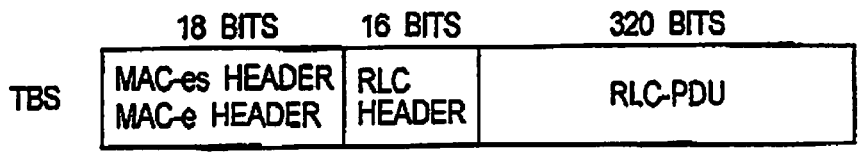
FIGS. 8A to 8B are views each showing an example of a format of uplink user data transmitted on E-DPDCH by a mobile station according to the first embodiment of the present invention.
Figure 8B:
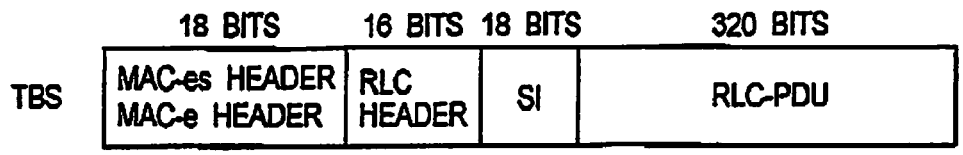

As shown in FIG. 7, a cell under the control of the radio base station NodeB#1 acquires E-TFCI corresponding to a transport block at the time of transmitting only a single RLC-PDU (transport blocks shown in FIGS. 8A to 8B).

AS shown in FIG. 8A, the size of the transport block at the time of transmitting only the single RLC-PDU is 354 bits, because the size of the RLC-PDU is "320 bits," the size of an RLC header is "16 bits," and the size of an MAC-es header and an MAC-e header in combination is "118 bits".

Further, as shown in FIG. 8B, the size of the transport block at the time of transmitting only an SI (Scheduling Information) in addition to the single RLC-PDU becomes 372 bits, since the size of the SI is "18 bits."

Here, the cell under the control of the radio base station NodeB#1 manages a correspondence table between "E-TFCI" and "TBS (Transport Block Size)" shown in FIG. 9, and acquires "E-TFCI=3" in an example of FIG. 8A, and "E-TFCI=4" in an example of FIG. 8B by referring to the correspondence table. Description will be given on the assumption that "E-TFCI=3".

In Step S102, using (Expression 1) described in "3GPP TS 25.214 5.1.2.5 B2", the cell under the control of the radio base station NodeB#1 calculates $\beta_{ed,i,harq}$ corresponding to E-TFCI calculated in Step S101.

$$\beta ed, i, harq = \beta ed, ref \sqrt{\frac{Le, ref}{Le, i}} \sqrt{\frac{Ke, i}{Ke, ref}} \cdot 10^{\left(\frac{\Delta harq}{20}\right)} \quad \text{(Expression 1)}$$

Where $\beta_{ed,ref}$ denotes a "Gain factor" of "Reference E-TFC" to be notified by the radio network controller RNC, $L_{e,ref}$ denotes the "number of E-DPDCHs" of "Reference E-TFC" to be notified by the radio network controller RNC, and $K_{e,ref}$ denotes "TBS" of "Reference E-TFC" to be notified by the radio network controller RNC, Further, $L_{e,i}$ denotes the number of E-DPDCHs (a fixed value=1) in E-TFCI (=3) corresponding to the single RLC-PDU. $K_{e,i}$ denotes TBS (=354 bits) in E-TFCI (=3) corresponding to the single RLC-PDU. $\Delta_{harq}$ denotes "HARQ Power Offset" to be notified by the radio network controller RNC.

Now, in the case of $\beta_{ed,ref}$=30/15, $L_{e,ref}$=1, $K_{e,ref}$=354, and $\Delta_{harq}$=0, $\beta_{ed,i,harq}$=30115 is obtained. The following is described with the use of the obtained $\beta_{ed,i,harq}$.

In Step S103, by referring to a table shown in FIG. 10, the cell under the control of the radio base station NodeB#1 calculates a maximum $\beta_{ed,k}/\beta_c$ in the state at which $\beta_{ed,k} \leq \beta_{ed,i,harq}$ holds. Here, the table shown in FIG. 10 is the table described in "3GPP TS 25.213 Table 1.B.2".

In the present embodiment, since $\beta_{ed,i,harq}=30/15$, the maximum $\beta_{ed,k}/\beta_c$ in the state at which $\beta_{ed,k} \leq \beta_{ed,i,harq}$ holds is "30/15".

In Step S104, since $\beta_{ed,k}/\beta_c$ represents an amplitude ratio, the cell under the control of the radio base station NodeB#1 sets, as an index of the initial SG, the "Index" corresponding to the maximum "Absolute Grant Value" not exceeding $(\beta_{ed,k}/\beta_c)^2$, by referring to a correspondence table between "Absolute Grant Value" and "Index" shown in FIG. 11.

Here, the correspondence table between "Absolute Grant Value" and "Index" shown in FIG. 11 is the table described in "3GPP TS 25.212 Table 16B."

In the present embodiment, the cell under the control of the radio base station NodeB#1 extracts "8" as an index of the initial SG $(30/15)^2$.

Alternatively, in Step S104, since $\beta_{ed,k}/\beta_c$ represents an amplitude ratio, the cell under the control of the radio base station NodeB#1 may set, as an index of the initial SG, the "Index" corresponding to the maximum "Scheduled grant" not exceeding $(\beta_{ed,k}/\beta_c)^2$, by referring to a correspondence table between "Scheduled grant" and "Index" shown in FIG. 12.

Here, the correspondence table between "Scheduled grant" and "Index" shown in FIG. 12 is the table described in "3GPP TS 25.212 Table 9.2.5.2.1.1".

In the present embodiment, the cell under the control of the radio base station NodeB#1 extracts "14" as an index of the initial SG $(30/15)^2$.

In Step S1003 of FIG. 6, the cell under the control of the radio base station NodeB#1 (in the example of FIG. 3, the radio base station NodeB#2) transmits "Radio Link Setup Response", "Radio Link Reconfiguration Ready", and others to the radio network controller RNC, and thereby notifies the radio network controller RNC of the determined initial SG.

Further, as shown in FIG. 5, when the serving cell for the mobile station UE is changed from the first cell to the second cell included in the cell set RLS in communication under the control of the radio base station NodeB#1, the second cell under the control of the radio base station NodeB#1 may or may not notify the radio network controller RNC of the determined initial SG (initial granted value).

In Step S1004, the radio network controller RNC transmits an RRC message including the extracted index of the initial SC to the mobile station UE, and thereby notifies the mobile station UE of the initial SG.

Further, as shown in FIG. 5, when the serving cell for the mobile station UE is changed from the first cell to the second cell included in the cell set RLS in communication under the control of the radio base station NodeB#1, the radio network controller RNC may or may not notify the mobile station UE of the initial SG (initial granted value).

Additionally, as shown in FIG. 5, when the serving cell for the mobile station UE is changed from the first cell to the second cell included in the cell set RLS in communication under the control of the radio base station NodeB#1, the second cell may or may not notify the mobile station UE of the latest SG (granted value) which has been notified to the mobile station UE by the former serving cell before the change.

In Step S1005, until receiving the SG (granted value) notified by the cell under the control of the radio base station NodeB#1 through E-AGCH or E-RGCH, the mobile station UE transmits uplink user data at a transmission rate corresponding to the initial SG through an uplink user data transmission channel (E-DCH).

(Advantages and Effects of the Mobile Communication System According to the First Embodiment of the Present Invention)

The mobile communication system according to the present embodiment is configured to set, as an initial SG, an SG corresponding to E-TFCI by which only one RLC-PDU (and SI) is transmittable on an E-DCH, when the E-DCH is set up, or when the setting of the E-DCH is changed, for example. Therefore, the mobile communication system can avoid drastic change of the receiving power for the uplink user data in the radio base station NodeB and thereby prevent deterioration of the receiving quality of uplink user data in communication.

Note that the operation of the above-mentioned mobile station UE and the radio base station NodeB may be implemented by hardware, by a software module executed by a processor, or by a combination of the two.

The software module may be provided in a storage medium of any form such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to a processor so that the processor can read and write information from and to the storage medium. The storage medium may otherwise be integrated in a processor. The storage medium and the processor may be provided within an ASIC, and the ASIC may be provided in a mobile station UE, a radio base station NodeB and a radio network controller RNC. Otherwise, the storage medium and the processor may be provided in a mobile station UE and a radio base station NodeB as discrete components.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplary description and does not limit the present invention in any way.

What is claimed is:

1. A mobile communication method by which a mobile station transmits uplink user data at a transmission rate corresponding to a granted value notified to the mobile station by a cell under control of a radio base station, the method comprising:

causing the cell under the control of the radio base station to determine an initial granted value when an uplink user data transmission channel is set up between the mobile station and the cell under the control of the radio base station;

causing the cell under the control of the radio base station to notify a radio network controller of the initial granted value determined;

causing the radio network controller to notify the mobile station of the initial granted value notified by the cell under the control of the radio base station; and causing the mobile station to transmit the uplink user data via the uplink user data transmission channel at the transmission rate corresponding to the initial granted value notified by the radio network controller, after the uplink user data transmission channel is set up, until the mobile station receives the granted value notified by the cell under the control of the radio base station, wherein the cell under the control of the radio base station sets the initial granted value to be equal to the granted value used in transmitting only a single data unit on the uplink user data transmission channel.

2. A mobile communication method by which a mobile station transmits uplink user data at a transmission rate corresponding to a granted value notified to the mobile station by a cell under control of a radio base station, the method comprising:

causing a target cell to determine an initial granted value when a serving cell for the mobile station is changed from a source cell under the control of a first radio base station to the target cell under the control of a second radio base station;

causing the target cell to notify a radio network controller of the initial granted value determined;

causing the radio network controller to notify the mobile station of the initial granted value notified by the target cell; and causing the mobile station to transmit the uplink user data via an uplink user data transmission channel set up between the mobile station and the target cell at the transmission rate corresponding to the initial granted value notified by the radio network controller, after the change of the serving cell, until the mobile station receives the granted value notified by the target cell, wherein the target cell sets the initial granted value to be equal to the granted value used in transmitting only a single data unit on the uplink user data transmission channel.

3. A mobile communication method by which a mobile station transmits uplink user data at a transmission rate corresponding to a granted value notified to the mobile station by a cell under control of a radio base station, the method comprising:

causing a target cell to determine an initial granted value when a serving cell for the mobile station is changed from a source cell included in a cell set in communication under the control of the radio base station to the target cell not in communication under the control of the radio base station;

causing the target cell to notify a radio network controller of the initial granted value determined;

causing the radio network controller to notify the mobile station of the initial granted value notified by the target cell; and causing the mobile station to transmit the uplink user data via an uplink user data transmission channel set up between the mobile station and the target cell at the transmission rate corresponding to the initial granted value notified by the radio network controller, after the change of the serving cell, until the mobile station receives the granted value notified by the target cell, wherein the target cell sets the initial granted value to be equal to the granted value used in transmitting only a single data unit on the uplink user data transmission channel.

4. A mobile communication method by which a mobile station transmits uplink user data at a transmission rate corresponding to a granted value notified to the mobile station by a cell under control of a radio base station, the method comprising:

causing the cell under the control of the radio base station to determine an initial granted value when a change is made to a sub-frame length in an uplink user data transmission channel set up between the mobile station and the cell under the control of the radio base station;

causing the cell under the control of the radio base station to notify a radio network controller of the initial granted value determined;

causing the radio network controller to notify the mobile station of the initial granted value notified by the cell under the radio base station; and causing the mobile station to transmit the uplink user data via the uplink user data transmission channel at the transmission rate corresponding to the initial granted value notified by the radio network controller, after the change of the sub-frame length in the uplink user data transmission channel, until the mobile station receives the granted value notified by the cell under the control of the radio base station, wherein the cell under the control of the radio base station sets the initial granted value to be equal to the granted value used in transmitting only a single data unit on the uplink user data transmission channel.

5. The mobile communication method according to any one of claims 2 to 4, wherein when the serving cell for the mobile station is changed from a first cell to a second cell included in a cell set in communication under the control of the radio base station, the radio network controller does not notify the mobile station of the initial granted value.

6. The mobile communication method according to any one of claims 2 to 4, wherein when the serving cell for the mobile station is changed from a first cell to a second cell included in a cell set in communication under the control of the radio base station, the radio network controller notifies the mobile station of the initial granted value notified by the radio base station.

7. The mobile communication method according to any one of claims 2 to 4, wherein when the serving cell for the mobile station is changed from a first cell to a second cell included in a cell set in communication under the control of the radio base station, the second cell notifies the mobile station of a latest granted value notified to the mobile station by the first cell.

8. The mobile communication method according to any one of claims 2 to 4, wherein when the serving cell for the mobile station is changed from a first cell to a second cell included in a cell set in communication under the control of the radio base station, the second cell does not notify the mobile station of a latest granted value notified to the mobile station by the first cell.

9. A mobile communication system in which a mobile station is configured to transmit uplink user data at a transmission rate corresponding to a granted value notified by a cell under control of a radio base station, wherein the cell under the control of the radio base station is configured to determine an initial granted value when an uplink user data transmission channel is set up between the mobile station and the cell under the control of the radio base station, the cell under the control of the radio base station is configured to notify a radio network controller of the initial granted value determined, the radio network controller is configured to notify the mobile station of the initial granted value notified by the cell under the control of the radio base station, the mobile station is configured to transmit the uplink user data via the uplink user data transmission channel at the transmission rate corresponding to the initial granted value notified by the radio network controller, after the uplink user data transmission channel is set up, until the mobile station receives the granted value notified by the cell under the control of the radio base station, and the cell under the control of the radio base station is configured to set the initial granted value to be equal to the granted value used in transmitting only a single data unit on the uplink user data transmission channel.

10. A mobile communication system in which a mobile station is configured to transmit uplink user data at a transmission rate corresponding to a granted value notified by a cell under control of a radio base station, wherein a target cell is configured to determine an initial granted value when a serving cell for the mobile station is changed from a source cell under the control of a first radio base station to the target cell under the control of a second radio base station, the target cell is configured to notify a radio network controller of the initial granted value determined, the radio network controller is configured to notify the mobile station of the initial granted value determined by the target cell, the mobile station is configured to transmit the uplink user data via an uplink user data transmission channel set up between the mobile station and the target cell at the transmission rate corresponding to the initial granted value notified by the radio network controller, after the change of a serving cell, until the mobile station receives the granted value notified by the target cell, and the target cell is configured to set the initial granted value to be equal to the granted value used in transmitting only a single data unit on the uplink user data transmission channel.

11. A mobile communication system in which a mobile station is configured to transmit uplink user data at a transmission rate corresponding to a granted value notified by a cell under control of a radio base station, wherein a target cell is configured to determine an initial granted value when a serving cell for the mobile station is changed from a source cell included in a cell set in communication under the control of the radio base station to the target cell not in communication under the control of the radio base station, the target cell is configured to notify a radio network controller of the initial granted value determined, the radio network controller is configured to notify the mobile station of the initial granted value determined by the target cell, the mobile station is configured to transmit the uplink user data via an uplink user data transmission channel set up between the mobile station and the target cell at the transmission rate corresponding to the initial granted value notified by the radio network controller, after the change of a serving cell, until the mobile station receives the granted value notified by the target cell, and the target cell is configured to set the initial granted value to be equal to the granted value used in transmitting only a single data unit on the uplink user data transmission channel.

12. A mobile communication system in which a mobile station is configured to transmit uplink user data at a transmission rate corresponding to a granted value notified by a cell under control of a radio base station, wherein the cell under the control of the radio base station is configured to determine an initial granted value when a change is made to a sub-frame length in an uplink user data transmission channel set up between the mobile station and the cell under the control of the radio base station, the cell under the control of the radio base station is configured to notify a radio network controller of the initial granted value determined, the radio network controller is configured to notify the mobile station of the initial granted value determined by the cell under the control of the radio base station, the mobile station is configured to transmit the uplink user data via the uplink user data transmission channel at the transmission rate corresponding to the initial granted value notified by the radio network controller, after the change of the sub-frame length in the uplink user data transmission channel, until the mobile station receives the granted value notified by the cell under the control of the radio base station, and the cell under the control of the radio base station is configured to set the initial granted value to be equal to the granted value used in transmitting only a single data unit on the uplink user data transmission channel.

13. The mobile communication system according to any one of claims 10 to 12, wherein when the serving cell for the mobile station is changed from a first cell to a second cell included in a cell set in communication under the control of the radio base station, the radio network controller is configured not to notify the mobile station of the initial granted value.

14. The mobile communication system according to any one of claims 10 to 12, wherein when the serving cell for the mobile station is changed from a first cell to a second cell included in the cell set in communication under the control of the radio base station, the radio network controller is configured to notify the mobile station of the initial granted value notified by the radio base station.

15. The mobile communication system according to any one of claims 10 to 12, wherein when the serving cell for the mobile station is changed from a first cell to a second cell included in a cell set in communication under the control of the radio base station, the second cell is configured to notify the mobile station of a latest granted value notified to the mobile station by the first cell.

16. The mobile communication system according to any one of claims 10 to 12, wherein when the serving cell for the mobile station is changed from a first cell to a second cell included in a cell set in communication under the control of the radio base station, the second cell is configured not to notify the mobile station of the latest granted value notified to the mobile station by the first cell.

17. A radio base station used for a mobile communication system in which a mobile station is configured to transmit uplink user data at a transmission rate corresponding to a granted value notified by a cell under control of a radio base station, the radio base station comprising:

a granted value determination unit configured to determine an initial granted value when an uplink user data transmission channel is newly set up between the mobile station and the cell under the control of the radio base station; and an initial granted value notification unit configured to notify a radio network controller of the initial granted value determined, wherein the mobile station is configured to transmit the uplink user data via the uplink user data transmission channel at the transmission rate corresponding to the initial granted value notified by the radio network controller, after the uplink user data transmission channel is set up, until the mobile station receives the granted value notified by the cell under the control of the radio base station, and the granted value determination unit is configured to set the initial granted value to be equal to the granted value used in transmitting only a single data unit on the uplink user data transmission channel.

18. A radio base station used for a mobile communication system in which a mobile station is configured to transmit uplink user data at a transmission rate corresponding to a granted value notified by a cell under control of a radio base station, the radio base station comprising:

a granted value determination unit configured to determine an initial granted value when a serving cell for the mobile station is changed, from a source cell under the control of a first radio base station different from the radio base station, to a target cell under the control of the radio base station; and an initial granted value notification unit configured to notify a radio network controller of the initial granted value determined, wherein the mobile station is configured to transmit the uplink user data via an uplink user data transmission channel set up between the mobile station and the target cell at the transmission rate corresponding to the initial granted value notified by the radio network controller, after the change of a serving cell, until the mobile station receives the granted value notified by the target cell, and the granted value determination unit is configured to set the initial granted value to be equal to the granted value used in transmitting only a single data unit on the uplink user data transmission channel.

19. A radio base station used for a mobile communication system in which a mobile station is configured to transmit uplink user data at a transmission rate corresponding to a granted value notified by a cell under control of a radio base station, the radio base station comprising:

a granted value determination unit configured to determine an initial granted value when a serving cell for the mobile station is changed from a source cell included in a cell set in communication under the control of the radio base station to a target cell not in communication under the control of the radio base station; and an initial granted value notification unit configured to notify a radio network controller of the initial granted value determined, wherein the mobile station is configured to transmit the uplink user data via an uplink user data transmission channel set up between the mobile station and the target cell at the transmission rate corresponding to the initial granted value notified by the radio network controller, after the change of a serving cell, until the mobile station receives the granted value notified by the target cell, and the granted value determination unit is configured to set the initial granted value to be equal to the granted value used in transmitting only a single data unit on the uplink user data transmission channel.

20. A radio base station used for a mobile communication system in which a mobile station is configured to transmit uplink user data at a transmission rate corresponding to a granted value notified by a cell under control of a radio base station, the radio base station comprising:

a granted value determination unit is configured to determine an initial granted value when a change is made to a sub-frame length in an uplink user data transmission channel set up between the mobile station and the cell under the control of the radio base station; and an initial granted value notification unit configured to notify a radio network controller of the initial granted value determined, wherein the mobile station is configured to transmit the uplink user data via the uplink user data transmission channel at the transmission rate corresponding to the initial granted value notified by the cell under the control of the radio network controller, after the change of the sub-frame length in the uplink user data transmission channel, until the mobile station receives the granted value notified by the cell under the control of the radio base station, and the granted value determination unit is configured to set the initial granted value to be equal to the granted value used in transmitting only a single data unit on the uplink user data transmission channel.

21. The radio base station according to any one of claims 18 to 20, wherein when the serving cell for the mobile station is changed from a first cell to a second cell included in a cell set in communication under the control of the radio base station, the second cell notifies the mobile station of a latest granted value notified to the mobile station by the first cell.

* * * * *